United States Patent

Porter et al.

[15] 3,700,081
[45] Oct. 24, 1972

[54] TRACTOR INCHING CONTROL UTILIZING A DECELERATOR

[72] Inventors: Robert B. Porter, Melrose Park; Clarence A. Ardelt, Wheaton; Robert C. Storck, Glen Ellyn, all of Ill.

[73] Assignee: International Harvester Company, Chicago, Ill.

[22] Filed: Jan. 26, 1971

[21] Appl. No.: 109,870

[52] U.S. Cl. ............... 192/.07, 192/.084, 192/.096
[51] Int. Cl. ............................................. B60k 29/00
[58] Field of Search ............ 192/.07, .072, .084, .096; 74/482

[56] References Cited

UNITED STATES PATENTS

| | | |
|---|---|---|
| 2,533,968 | 12/1950 | Sobie ................. 192/.084 |
| 2,812,043 | 11/1957 | Wilson ................. 192/.096 X |
| 1,050,826 | 1/1913 | Hancock, Jr. ........... 192/.096 |
| 1,421,147 | 6/1922 | Baxter ................. 192/.096 |
| 2,429,714 | 10/1947 | Gedstad ................. 74/482 |
| 2,575,901 | 11/1951 | Wheeler ................. 192/.096 |
| 2,656,024 | 10/1953 | Sobie ................. 192/.084 |
| 3,535,951 | 10/1970 | Larson et al. ............. 74/482 |

Primary Examiner—Allen D. Herrmann
Attorney—Noel G. Artman

[57] ABSTRACT

Inching mechanism for accurately controlling final movement of a loader toward the body of a truck being loaded thereby. A separately provided decelerator pedal coordinates neutralization of the customarily provided transmission and deceleration of the customary engine for vehicle inching purposes, all without disturbing settings of such customarily provided gear selector and clutch operator and fuel control.

7 Claims, 3 Drawing Figures

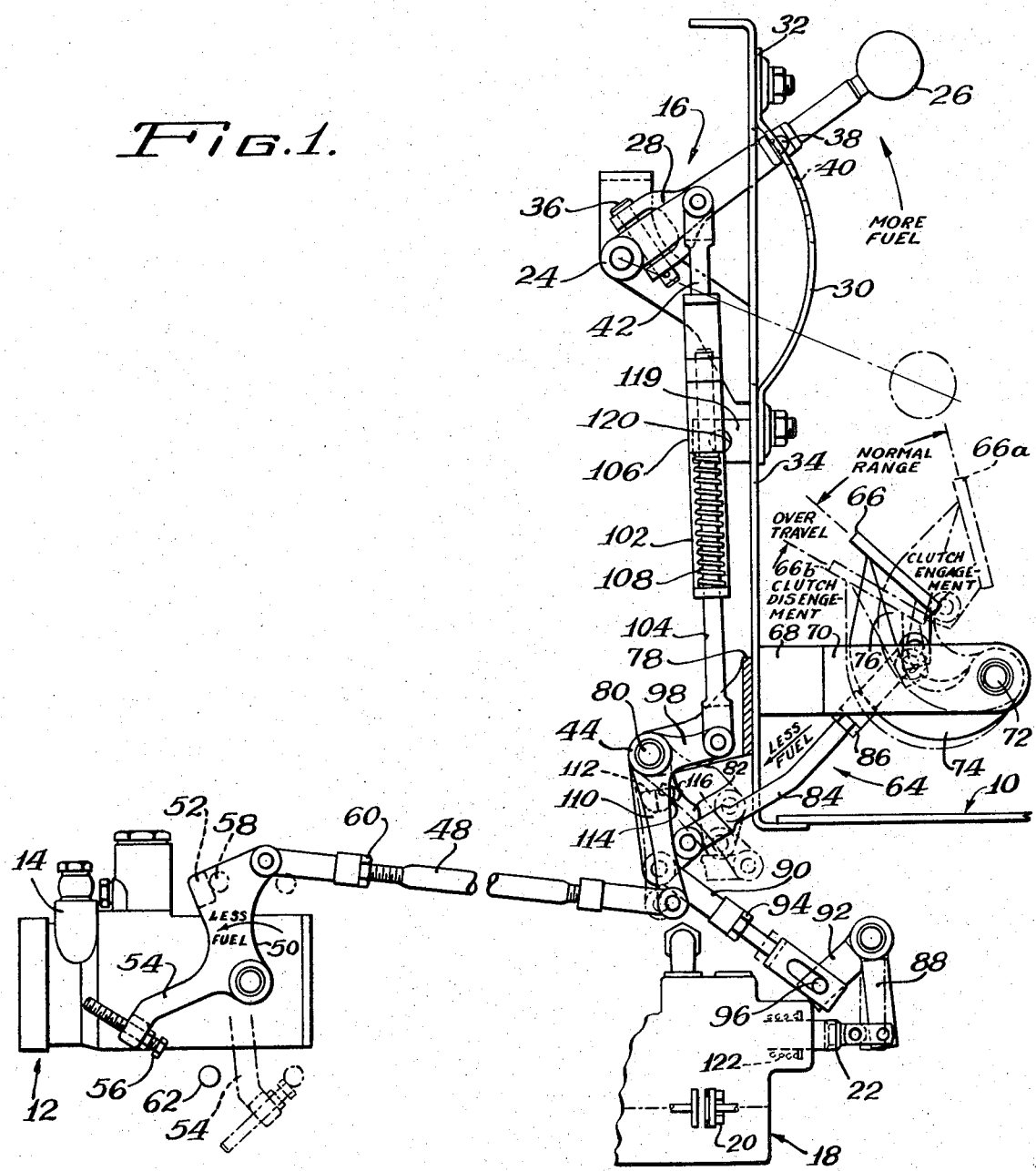

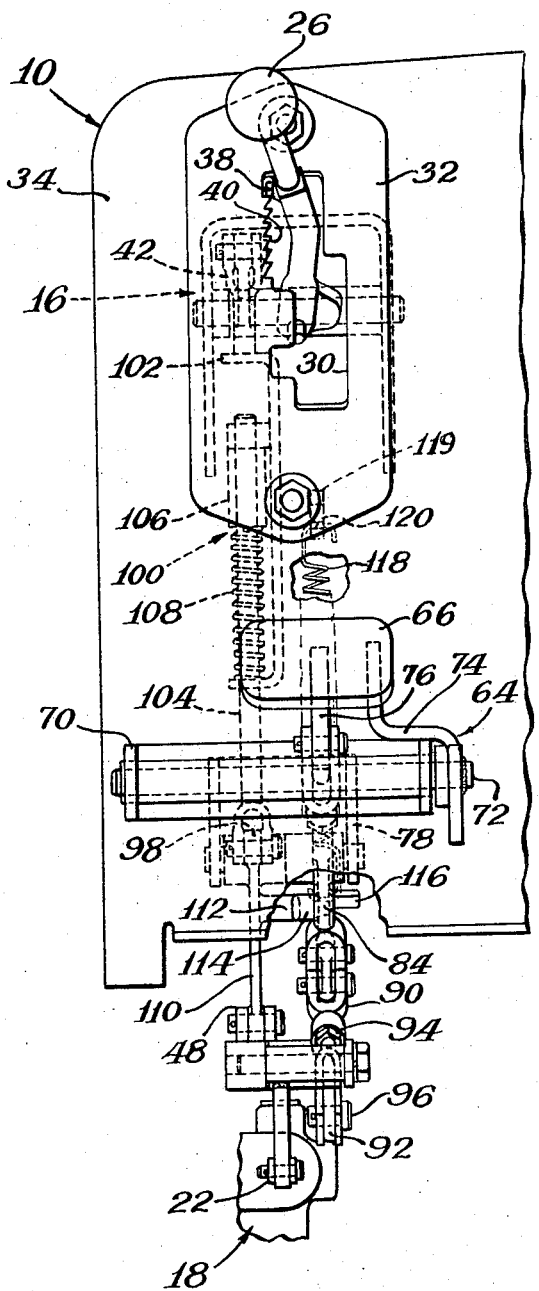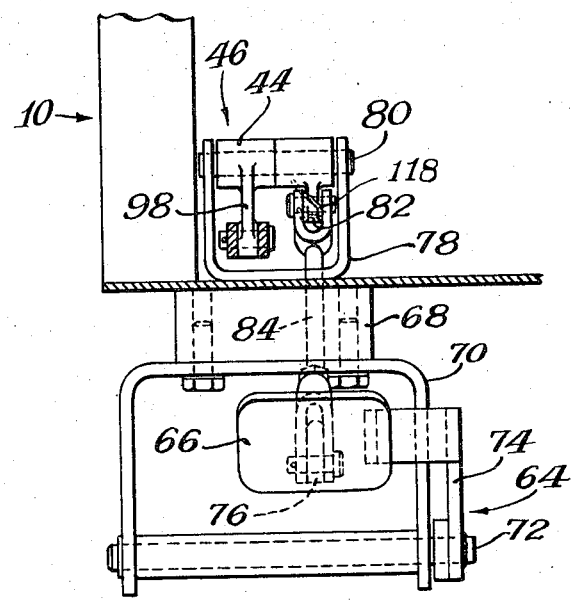

TRACTOR INCHING CONTROL UTILIZING A DECELERATOR

Inching mechanism for accurately controlling final movement of a self-powered implement to the destination for unloading. A tractor loader is one example, and the transmission and engine speed must be coordinated for minimum values to do the inching properly.

A transmission in the vehicle as herein contemplated is controlled in its coupling function by customary gear selector and clutch operator control. An engine in the vehicle is controlled in its speed function by a customary fuel control, e.g., a fuel pump control.

A separately provided decelerator in accordance with the present invention coordinates neutralization of the transmission and deceleration of the engine for vehicle inching purposes as will now be described in detail, all without disturbing settings of such customarily provided gear selector and clutch operator and fuel control referred to. Inching becomes critical upon approach of the vehicle to another vehicle in close quarters thereto, especially that truck which is intended to be loaded thereby. Control is precise at a very low engine speed with the clutch engaged, and at a very low speed with the clutch disengaged, and is especially precise herein at a very low engine speed with an incrementally modulated clutch action.

Further features, objects, and advantages will either be specifically pointed out or become apparent when, for a better understanding of the invention, reference is made to the following description taken in conjunction with the accompanying drawings, which show a preferred embodiment thereof and in which:

FIG. 1 is in elevation, as viewed from the left side of a crawler loader embodying our invention;

FIG. 2 is similarly in elevation, as viewed from the rear; and

FIG. 3 is in plan, as viewed from the top.

More particularly in the drawings, a tractor loader 10 is shown having: an engine 12 with a fuel control 14 comprising a variable displacement fuel injection pump; an operator primary input linkage 16 for setting engine speed by varying the pumped fuel displacement in the fuel control 14; a neutralizable transmission 18 providing a coupling from the engine 12 to the vehicle tracks, not shown, and comprising change speed gearing and one or more friction devices including a fluid operated clutch 20; and customary gear selector and clutch operator control to operate the transmission 18, including a pressure dump valve 22 for the fluid operated clutch 20.

PRIMARY INPUT LINKAGE

A hollow rockshaft 24 in the linkage which is journalled on a fixed horizontal axis has a connection to a fuel control handle 26, and carries a motion transmitting crank 28 which is in the plane of the rockshaft and of the handle, and projects in the same direction as the latter. The handle 26 is constrained by its rockshaft connection to travel with its midportion in the generally vertical gate slot 30 defined by a quadrant 32 which is affixed to a vertical tractor instrument panel 34.

Adjacent the rockshaft 24, a generally vertical pivot 36 in the handle connection enables a pawl tooth 38 on the handle mid-portion to be disengaged from one-way rachet type teeth 40 formed in the margin of the slot 30. That is to say, the operator moves the handle 26 slightly to his right for such disengagement whereupon he is free to depress the handle 26 for less fuel. The angles of the teeth 40 readily permit the operator to rachet the handle 26 upwardly into the more-fuel-direction, as indicated by an arrow.

From a depending connection 42 on the crank 28, the primary input linkage is connected through an output linkage 46, including a bellcrank 44, to the fuel control 14.

OUTPUT LINKAGE — FIG. 1

Specifically, a longitudinal link 48 which is movable fore and aft is connected between the bellcrank 44 and the upper arm 50 of a bellcrank on the fuel control 14. The upper arm 50 carries a transversely disposed actuator lug 52, and a lower arm 54 of the bellcrank carries an actuator bolt 56 which is adjustably locked in threads on the arm.

The fuel control 14 has an upstanding speed lever more or less concentric with the bellcrank, and a ball stud 58 carried by the lever is controlled by the actuator lug 52 and by a spring, not shown, which constantly biases the lever in the clockwise direction of less fuel as indicated by an arrow. A locked threaded connection 60 in the longitudinal link 48 enables the bellcrank to be adjusted in angle for holding the speed lever in high idle position corresponding to the rightmost position of the speed ball stud 58 as shown in phantom lines.

The fuel control 14 has a depending start-stop lever more or less concentric with the bellcrank, and a ball stud 62 carried thereby is controlled by the actuator bolt 56 and by a spring, not shown, constantly biasing the stop lever in a clockwise direction as viewed in FIG. 1. The length of protrusion of the actuator bolt 56 is threadably locked to hold both the stop ball stud 62 in a position corresponding to engine shutoff, which is the rightmost position as shown in FIG. 1 in phantom lines.

Novelty is felt to reside in a secondary input linkage 64, controlled by a decelerator pedal 66 and coordinating the transmission 18 and engine speed for minimum values.

SECONDARY INPUT LINKAGE

A spacer 68 on the tractor instrument panel 34 carries a U-shaped cantilever bracket 70, and the bracket 70 supports a pivot shaft 72 journalled therein. Pedal arm 74 having an offset between its ends carries the pedal 66 at its forward end and is made fast to the pivot shaft at a point between the rear end of the arm 74 and the outer right end of the shaft 72. The pedal 66 at its mid-portion carries a depending triangular plate 76.

A U-shaped cantilever bracket 78 affixed to the front of the instrument panel 34 carries a fixed pivot shaft 80, and the shaft 80 pivotally supports a depending operator link 82. A motion transmitting link 84 pivotally interconnects the depending end of the triangular pedal plate 76 and a rearward point on the depending end of the operator link 82. The motion transmitting link 84 has a locked threaded connection 86 therein to adjust the link length for reasons hereinafter discussed.

A transmission neutralizing bellcrank 88 has a depending arm linked to the clutch dump valve 22. A drag link 90 is connected between a forward arm 92 on the bellcrank and a forward point on the depending end of the operator link 82. A locked threaded connection 94 in the drag link 90 is between the ends to adjust the length for reasons to be discussed, and a pin and slot connection 96 is between the lower end of the drag link and the bellcrank forward arm 92 to afford independent travel of the pedal 66 throughout its normal range without actuating the clutch dump valve 22 and neutralizing the transmission.

Novelty is felt to reside in the output linkage 46 and its connections, and specifically in the bellcrank 44 thereof which is common to the primary and secondary linkages.

BELLCRANK 44 — FIGS. 1 AND 3

The common bellcrank 44 swings on the same fixed pivot shaft 80 concentrically to and independently of the depending operator link 82. A horizontally disposed rear leg 98 of the bellcrank is secured at its free end by means of a stretch joint 100 to the connection 42 from the primary linkage. A guide 102 made of strip metal with turned ends forms a slide bearing receiving a relatively reciprocal rod 104. The spring abutment 106 on the rod engages the upper end of a compression spring 108, the lower end of which rests on a spring perch in the guide 102. When the joint 100 "stretches", the abutment 106 causes the spring 108 to compress by a distance s. The spring 108 functions to bias the joint back to the unstretched condition.

A depending leg 110 carries a lateral lug 112. The lug 112 forms an overtraveling abutment joint with an abutting lug 114 on the operator link 82 to enable the bellcrank 44 to overtravel the operator link. Thus, when the operator link 82 is in its uppermost position as indicated by a phantom line showing in FIG. 1, the operator link 82 can remain with a stop lug 116 thereof in engagement with the bracket 78 thereabove and without being disturbed when the bellcrank 44 is rocked by the primary input linkage 16.

The locked threaded connection 86 in the motion transmitting link 84 is adjusted so that the operator link 82 is positioned according to the uppermost phantom line showing when the decelerator pedal occupies its fully released position as shown by the broken lines 66a. The pedal 66 moves through a normal range of travel to the solid line position shown and overtravels through an immediately contiguous range to a fully depressed position therebelow as shown by the broken lines 66b.

DECELERATOR OPERATION

Pedal 66 is free to move in the normal range and overtravel range without disturbing the fuel control handle 26 when the latter occupies its solid line high idle position. While the pedal 66 is in those two ranges, a weaker spring 118 (FIGS. 2 and 3) which is hooked at its upper end in an anchoring hole 120 is placed in tension by the operator link 82 which is connected thereto. The spring anchoring hole 120 is formed in a fixed bracket 119 (FIGS. 1 and 2).

Also, when the pedal has been depressed to a point to take its solid line position, the pin and slot connection 96 takes up at that point so that all farther depression of the pedal additionally places a strong spring 122 in compression in the clutch dump valve 22. While not necessarily material to an understanding of the invention, the fact remains that, on gear shift tractors equipped with the present decelerator pedal, a full depression of the decelerator is the way in which the operator makes a running change from one gear to another.

TWO STAGES

At the time of approach of the loader 10 to the body of a dump truck for unloading into the latter, the operator at the time has the loader bucket full and in raised position, whereupon he presses the pedal 66 with his left foot. The amount of depression determines the amount of speed reduction in the loader engine 12 and, as a first stage, the operator moves the pedal down to the end of the normal range whereby the loader is inching forward with the engine running at 900 r.p.m., for example. With the pedal 66 down that far to the solid line position, the weaker spring 118 in this normal stage range is causing the operator link 82 to exert about 10 or 12 pounds' force of resistance against the pedal. With predetermined initial movement of the pedal thereafter down into the range of overtravel, the weaker spring 118 and the strong spring 122 in the dump valve 22 combine with a total force of 20 to 25 pounds against the pedal, and the combined force ultimately reaches 40 pounds against the pedal when the latter has fully overtraveled to the position shown by the broken lines 66b.

FLUID OPERATED CLUTCH 20 — FIG. 1

In simplest form, the dump valve 22 and the hydraulic cylinder of the fluid operated clutch 20 can provide simple engaged-disengaged control over the clutch. Preferably, however, a modulated clutch 20 and a modulating valve 22 are provided as illustrated so that the clutch can be progressively slipped or feathered by the operator. The operator is fully aware of each degree of the slip because of the progressively required twenty to forty pound pedal force required and, with such awareness, the chances that he will burn out a clutch or a friction drive device are diminished. With the clutch fully disengaged, then in correspondence thereto the rest of the link arrangement is with the drag link 90, the transmission neutralizing bellcrank 88, and the dump valve 22 positioned according to the leftwardmost phantom line showing. The corresponding positions of the operator link 82 and the bellcrank 44 are the leftwardmost positions as shown by phantom lines in FIG. 1. The engine at this time can sustain a speed of 900 r.p.m. if desired. Because the engine is completely uncoupled from load by the transmission, over-travel of the pedal in the usual arrangement in practice causes the speed lever on the fuel control to farther reduce the speed of the unloaded engine toward and including a low idle setting, e.g. 600 r.p.m.

In the latter case, the primary input linkage 16 will have five effective stages of travel consecutively in one arc if moved when the decelerator pedal is not depressed. Specifically, in moving from the solid line position to the phantom line position as shown in FIG. 1, the fuel control handle 26 will cause the bellcrank on the fuel control 14 to move, first, between an extreme position with the speed ball stud 58 as it appears in the rightwardmost phantom line showing in engagement with the actuator lug 52, and a 900 r.p.m. position with the speed ball stud 58 conforming to the hidden line showing in engagement by the actuator lug 52, second, between the just said 900 r.p.m. position, and a low idle position which is slightly to the left thereof and in which there is contact, with the lug 52 and the stud 58 in engagement, third, between the low idle position with the lug 52 and stud 58 in engagement, and a run position with the latter engagement disengaged and with the stop ball stud 62 positioned according to the solid line showing and in engagement with the actuator bolt 56, fourth, between the run position and an excess fuel position, not shown, which is intermediate and in which the stop ball stud 62 has engagement with the actuator bolt 56 and, fifth, between the just referred to excess fuel position and an intermediate point, and an extreme stop position with the stop ball stud placed according to the rightwardmost phantom line showing and in engagement with the actuator bolt 56.

The converse action of the fuel control handle 26 in moving from shut-off, through excess fuel for cranking, and so forth, to high idle for maximum speed will be apparent from the foregoing and so is omitted.

The converse action of the decelerator pedal 66 from full depression through the overtravel range and normal range of travel generally occurs after the loader has reached a standstill due to neutralization of the transmission, and after the operator has ensured that the transmission is also neutralized by other means i.e., by disengaging the gears or opening up the clutch pressure fluid to drain through another path. So release of the decelerator pedal causes nothing more than that the engine resumes its former speed, up to high idle if the fuel control handle 26 remains so set. The operator then, on his own decision after completing the bucket unloading, reverses the transmission and causes the loader to retract and reload the bucket.

Details of the speed lever and the start-stop lever on the fuel control 14 are separately disclosed and claimed in a copending Porter-Johnson patent application Ser. No. 62,470, filed Aug. 10, 1970, and owned by the same assignee. By present arrangement, the fuel handle 26 exerts single lever control over the two levers in a separated, two-stage operation. The decelerator 66 is yet another single lever control, exerting control over both the speed lever and the transmission neutralizing bellcrank.

Variations within the spirit and scope of the invention described are equally comprehended by the foregoing description.

What is claimed is:

1. For use in a tractor vehicle with a power train including linkage-controlled engine which has speed setting means and a linkage-controlled coupling which is releasable from an engaged status coupling the engine to a load, foot control mechanism to inch-ahead the vehicle comprising:

an actuating member; and
   linkage to change the engine to a predetermined speed setting upon a depression of said actuating member and to release the coupling upon farther depression of the member;
   depression of said actuating member being in a normal range of travel to an engine slow speed position of the actuating member corresponding to an engine slow speed setting, which is for inching of the vehicle and which is at one end of the operational-speed run-range thereof, said farther depression being in an overtravel range immediately beyond said slow speed position of the member.

2. The invention of claim 1, the linkage characterized by:
   primary input linkage means;
   secondary input linkage means, said secondary input linkage means carrying said actuating member; and
   an output linkage for connection to said engine speed setting means, said output linkage having a separate connection to each of the input linkage means for selective operation by either.

3. For use in a tractor vehicle with a power train including a linkage-controlled engine which has speed setting means and a linkage-controlled coupling which is releasable from an engaged status coupling the engine to a load, foot control mechanism to inch-ahead the vehicle comprising:
   an actuating member; and
   linkage to change the engine to a predetermined speed setting upon a depression of said actuating member and to release the coupling upon farther depression of said member;
   depression of said actuating member being in a normal range of travel to an engine slow speed position of the actuating member corresponding to an engine slow speed setting, which is for inching of the vehicle and which is at one end of the operational-speed run-range thereof, said farther depression being in an overtravel range immediately beyond said slow speed position of the member;
   said linkage having resistance from spring biasing means, and having a normal stage portion and an overtravel stage portion, whereby depression and farther depression of said member while the coupling is engaged and is being disengaged is resisted by weaker spring biasing means against the normal stage portion, and whereby said farther depression while the coupling is being disengaged is augmentally resisted by strong biasing means against the overtravel stage portion.

4. For use in a tractor vehicle with a power train including a linkage-controlled engine which has speed setting means and a linkage-controlled coupling which is releasable from an engaged status coupling the engine to a load, foot control mechanism to inch-ahead the vehicle comprising:
   an actuating member; and
   linkage to change the engine to a predetermined speed setting upon a depression of said actuating member and to release the coupling upon farther depression of the member;
   depression of said actuating member being in a normal range of travel to an engine slow speed position of the actuating member corresponding to an engine slow speed setting, which is for inching of the vehicle and which is at one end of the operational-speed run-range thereof, said farther depression being in an overtravel range immediately beyond said slow speed position of the member;

the linkage characterized by primary input linkage means;

secondary input linkage means, said secondary input linkage means carrying said actuating member; and an output linkage for connection to said engine speed setting means, said output linkage having a separate connection to each of the input linkage means for selective operation by either;

the linkage further characterized by a free end of the primary input linkage means carrying operator-operated means for moving same to positions corresponding therewith, between and including a high idle position and a depressed operator-operated means position for engine shut-off.

5. For use in a tractor vehicle with a power train including a linkage-controlled engine which has speed setting means and a linkage-controlled coupling which is releasable from an engaged status coupling the engine to a load, foot control mechanism to inch-ahead the vehicle comprising:

an actuating member; and linkage to change the engine to a predetermined speed setting upon a depression of said actuating member and to release the coupling upon farther depression of said member;

depression of said actuating member being in a normal range of travel to an engine slow speed position of the actuating member corresponding to an engine slow speed setting, which is for inching of a vehicle and which is at one end of the operational-speed run-range thereof, said farther depression being in an overtravel range immediately beyond said slow speed position of the member;

said linkage comprising primary input linkage means and secondary input linkage means, said secondary input linkage means carrying said actuating member; and an output linkage for connection to said engine speed setting means, said output linkage having a separate connection to each of the input linkage means for selective operation by either;

the separate connection of the output linkage to said primary input linkage means comprising a stretch joint.

6. For use in a tractor vehicle with a power train including a linkage-controlled engine which has speed setting means and a linkage-controlled coupling which is releasable from an engaged status coupling the engine to a load, foot control mechanism to inch-ahead the vehicle comprising:

an actuating member; and linkage to change the engine to a predetermined speed setting upon a depression of said actuating member and to release the coupling upon farther depression of said member;

depression of said actuating member being in a normal range of travel to an engine slow speed position of the actuating member corresponding to an engine slow speed setting, which is for inching of a vehicle and which is at one end of the operational-speed run-range thereof, said farther depression being in an overtravel range immediately beyond said slow speed position of the member;

said linkage comprising primary input linkage means and secondary input linkage means, said secondary input linkage means carrying said actuating member; and an output linkage for connection to said engine speed setting means, said output linkage having a separate connection to each of the input linkage means for selective operation by either;

the separate connection of the output linkage to the secondary input linkage means comprising an overtravel joint.

7. For use in a tractor vehicle with a power train including a linkage-controlled engine which has speed setting means and a linkage-controlled coupling which is releasable from an engaged status coupling the engine to a load, foot control mechanism to inch-ahead the vehicle comprising:

an actuating member;

linkage to change the engine to a predetermined speed setting upon a depression of said actuating member and to release the coupling upon farther depression of the member;

depression of said actuating member being in a normal range of travel to an engine slow speed position of the actuating member corresponding to an engine slow speed setting, which is for inching of the vehicle and which is at one end of the operational-speed run-range thereof, said farther depression being in an overtravel range immediately beyond said slow speed position of the member;

primary input linkage means in said linkage;

secondary input linkage means in said linkage, said secondary input linkage means carrying said actuating member;

an output linkage in said linkage for connection to said engine speed setting means, said output linkage having a separate connection to each of the input linkage means for selective operation by either;

a stretch joint in the connection of the output linkage to the primary input linkage means;

an overtravelling abutment joint in the separate connection of the output linkage to the secondary input linkage means; and a link member in the output linkage common to the just said joints operable by travelling due to its connection with either joint in conjoint movement therewith upon being duly selected, while at the same time overtravelling each joint when operated by the other.

* * * * *